US012601470B1

(12) United States Patent
Guo

(10) Patent No.: US 12,601,470 B1
(45) Date of Patent: Apr. 14, 2026

(54) FLOOR LAMP WITH INTERCONNECTED LIGHT EMITTING TUBES

(71) Applicant: SHENZHEN GIANT LIGHTING TECHNOLOGY CO., LTD, Shenzhen (CN)

(72) Inventor: Bin Guo, Shenzhen (CN)

( * ) Notice: Subject to any disclaimer, the term of this patent is extended or adjusted under 35 U.S.C. 154(b) by 0 days.

(21) Appl. No.: 19/004,485

(22) Filed: Dec. 30, 2024

(51) Int. Cl.

| | |
|---|---|
| ***F21V 23/00*** | (2015.01) |
| ***F21S 6/00*** | (2006.01) |
| ***F21V 15/015*** | (2006.01) |
| ***F21V 19/00*** | (2006.01) |
| ***F21V 23/02*** | (2006.01) |
| ***F21V 23/04*** | (2006.01) |
| ***F21V 23/06*** | (2006.01) |
| ***H05B 45/20*** | (2020.01) |
| ***H05B 47/155*** | (2020.01) |
| ***H05B 47/17*** | (2020.01) |
| ***H05B 47/19*** | (2020.01) |
| *F21Y 103/10* | (2016.01) |
| *F21Y 113/10* | (2016.01) |
| *F21Y 115/10* | (2016.01) |

(52) U.S. Cl.
CPC ............ *F21V 23/009* (2013.01); *F21S 6/004* (2013.01); *F21V 15/015* (2013.01); *F21V 19/0055* (2013.01); *F21V 23/023* (2013.01); *F21V 23/045* (2013.01); *F21V 23/06* (2013.01); *H05B 45/20* (2020.01); *H05B 47/155* (2020.01); *H05B 47/17* (2020.01); *H05B 47/19* (2020.01); *F21Y 2103/10* (2016.08); *F21Y 2113/10* (2016.08); *F21Y 2115/10* (2016.08)

(58) Field of Classification Search
CPC ... F21S 6/004; F21S 4/28; F21S 6/005; F21V 23/009; F21V 19/0055; F21V 21/06
See application file for complete search history.

(56) References Cited

U.S. PATENT DOCUMENTS

| | | | | |
|---|---|---|---|---|
| 10,161,570 | B2 * | 12/2018 | Yuan | F21V 3/0625 |
| 10,851,984 | B2 * | 12/2020 | Zhang | F21V 23/06 |
| 10,907,785 | B2 * | 2/2021 | Shine | F21S 2/005 |
| 11,624,486 | B2 * | 4/2023 | Cho | F21V 21/005 362/217.02 |
| 11,892,147 | B1 * | 2/2024 | Jing | F21S 6/00 |
| 2006/0291220 | A1 * | 12/2006 | Chen | F21V 21/02 362/382 |
| 2011/0089390 | A1 * | 4/2011 | Steinkraus | F21V 23/026 256/65.02 |
| 2019/0120443 | A1 * | 4/2019 | Xia | F21S 6/002 |
| 2019/0376670 | A1 * | 12/2019 | Ludwig | F21V 15/015 |

* cited by examiner

*Primary Examiner* — Ismael Negron
(74) *Attorney, Agent, or Firm* — InHouse Co. Law Firm; Theodore S. Lee, Esq.

(57) ABSTRACT

The floor lamp includes a base, a bottom tube coupled to the base, at least one middle tube coupled to the bottom tube, a top tube coupled to the at least one middle tube, and a drive control circuit provided in the base. The middle tube and the top tube each include a heat dissipating portion, a circuit board is fixedly connected to the heat dissipating portion, at least one LED provided in the circuit board, a male terminal provided at a bottom end of the circuit board, and a female terminal provided at a top of the bottom tube and at least one of the circuit boards, the female terminal configured to be coupled to the male conductive terminal to connect the bottom, middle and top tubes together. The female terminal and the male conductive terminal each include a four-wire power supply and control interface.

14 Claims, 13 Drawing Sheets

FLOOR LAMP WITH INTERCONNECTED LIGHT EMITTING TUBES

TECHNICAL FIELD

The present invention relates to a lamp, and in particular relates to a floor atmosphere lamp.

BACKGROUND ART

An atmosphere lamp is a kind of decorative lighting lamp, which is used for enhancing an environmental atmosphere, creating a lighting atmosphere required for people's lives, and achieving an appropriate lighting effect. For a home environment, the atmosphere lamp can create a scene required for people through different brightness and different light colors, mainly plays a role in enhancing an atmosphere, and gives people a warm, relaxing, and comfortable feeling. A floor atmosphere lamp is a form of the atmosphere lamp. With the development of science and technique, LED becomes more and more popular as a lighting source, and is more easily used as lighting source for an atmosphere lamp because of its energy saving and various color conversion.

Existing floor lamps include floor atmosphere lamps, which are irregular in shape, large in occupied space, inconvenient to store and transport, and difficult to meet various needs. In particular, for an atmosphere lamp with a rod-shaped light emitting body, the use of a unitary light pole results in a high packaging cost, inconvenience in transportation and storage, and easy damage, and in a case of segmented packaging, the splicing of segments is a technical difficulty. Splicing of segments easily leads to poor structural stability and linear verticality of appearance of a spliced lamp, an existing segmented splicing structure occupies too much space due to a splicing connection part, which easily leads to shadows between the segmented lamp bodies, affecting the overall light emitting effect, and a segmented splicing circuit is complex in connection and is difficult to guarantee stability, which easily leads to poor continuity and stability of the lighting effect.

LED atmosphere lamps are generally divided into two types of high voltage and low voltage in terms of power supply, the low voltage means that a low voltage of power supply is within a safe voltage range for a human body, and a most important feature thereof is human safety. Existing segmented LED lamp products generally adopt a mode of grouping and controlling each light emitting unit, and one defective light emitting unit can cause the entire lamp group to malfunction and fail to emit light normally, and the existing segmented LED lamp products generally adopt an overall series connection mode, so that each group of LED light emitting body units has a voltage drop, and a first group of LED light emitting units and a last group of LED light emitting units have a large voltage difference, so that a light emitting effect of a lamp string is difficult to meet a design requirement. Moreover, existing segmented low-voltage LED lamps, especially so-called "colorful" lamps, generally adopt ordinary RGB three-color LED lamp beads to control the color conversion of the whole lamp string. The brightness of the ordinary RGB lamp beads is low, and the existing segmented low-voltage LED lamp uses a mixture of RGB three colors to form white light, so that the white light is different from a light color of a real white light lamp bead, and a light emitting effect of LED lamp beads that emit only white light is difficult to achieve.

SUMMARY OF THE INVENTION

A technical problem to be solved by the present invention is to overcome shortcomings in the related art and provide a floor atmosphere lamp which is easy to assemble and disassemble, stable in connection, convenient to transport and store, saves packaging volume, has a small number of spare part specifications, and high in production efficiency. The floor atmosphere lamp is easy to splice and control, high in structural stability and circuit connection stability after splicing, not easy to be damaged, can be independently controlled in a segmented manner, light emitting units can be freely increased or decreased, the appearance consistency of a spliced lamp body and a unitary light emitting body is high, and the voltage consistency of each light emitting unit is high, the light emitting effect is consistent, no dark area is generated, and continuity and stability of a lighting effect are high.

A first technical solution adopted by the present invention is as follows. The present invention includes a base, a top light emitting tube, at least one middle light emitting tube, and a drive control circuit, in which the base is provided with a bottom tube, the bottom tube, the middle light emitting tube, and the top light emitting tube each include a heat dissipating profile and a light transmitting tube, the light transmitting tube and the heat dissipating profile are axially plugged and fixed, a strip-shaped light source plate is fixedly connected to an outer side of a bottom plate of the heat dissipating profile, the light source plates of the top light emitting tube and the middle light emitting tube are each provided with a plurality of LED lamp beads, bottom ends of the light source plates of the top light emitting tube and the middle light emitting tube are each provided with a male conductive terminal to form an electrical circuit with the LED lamp beads, a top end of the light source plate of the bottom tube is provided with a female conductive terminal to form an electrical circuit with the drive control circuit, a top end of the light source plate of the middle light emitting tube is provided with the female conductive terminal to form an electrical circuit with the LED lamp beads, the male conductive terminal is adapted to the female conductive terminal, a bottom portion of each of the heat dissipating profiles of the top light emitting tube and the middle light emitting tube is provided with a bottom fixing hole, a top portion of each of the heat dissipating profiles of the bottom tube and the middle light emitting tube is provided with a top fixing hole, the top light emitting tube and each of the middle light emitting tubes are each provided with a connecting plate, the connecting plate is adapted to an inner cavity of each of the heat dissipating profiles, an upper portion of the connecting plate extends into a bottom portion of the inner cavity of the heat dissipating profile of the top light emitting tube or the middle light emitting tube, and a first screw passes through the bottom fixing hole and then is connected and fixed to the connecting plate, when the top light emitting tube, the middle light emitting tube, and the bottom tube are connected in sequence, a lower portion of the connecting plate at a bottom portion of the top light emitting tube or the middle light emitting tube positioned above extends into a top portion of the inner cavity of the heat dissipating profile of the middle light emitting tube or the bottom tube positioned below the top light emitting tube or the middle light emitting tube, and a second screw passes through the top fixing hole and then is connected and fixed to the connecting plate, so that the top light emitting tube, each of the middle light emitting tubes, and the bottom tube are connected and combined in sequence to form a column body with the same appearance, and at the same time, the male conductive terminals and the female conductive terminals, which are vertically adjacent to each other, of the top light emitting tube, each of the middle light emitting tubes, and the bottom tube are plugged and coupled to realize electrical connection, thereby supplying power to each of the LED lamp beads, the drive control circuit includes a power input socket interface configured to connect an external low-voltage power adapter to input direct current low-voltage power and an MCU controller configured to separately control a light emitting state and a light emitting effect one by one for each of the middle light emitting tubes and the top light emitting tube, an output end of the MCU controller is electrically connected to the female conductive terminal of the bottom tube, and is electrically connected in sequence through the male conductive terminal and the female conductive terminal of each of the middle light emitting tubes and the top light emitting tube connected to the female conductive terminal of the bottom tube in sequence, each of the light source plates is provided with at least one single-channel drive control IC configured to drive and control the LED lamp beads of each of the middle light emitting tubes and the top light emitting tube to emit light, each of the female conductive terminals and the male conductive terminals includes a four-wire power supply and control interface, and the four-wire power supply and control interface includes a power supply positive electrode, a power supply negative electrode, a white light control electrode, and a signal electrode.

The connecting plate is a profile, and a cross-sectional shape and a size of the connecting plate are adapted to a cross-sectional shape and a size of the inner cavity of the heat dissipating profile.

The drive control circuit is disposed in the base.

The power input socket interface is disposed on the base.

The base is provided with a control button configured to control the drive control circuit to control each of the light source plates to emit light.

The base is provided with a remote control receiving sensor that is controlled by a remote controller and is configured to receive a remote control sensing signal so as to control each of the light source plates to emit light and to change different light emitting modes and colors through the drive control circuit.

The drive control circuit includes an APP network control module that is controlled by a mobile phone APP and is configured to receive a network control signal and control each of the light source plates to emit light and change different light emitting modes and colors through the drive control circuit.

A top portion of the top light emitting tube is provided with a top cover.

The first screw is a set screw.

The second screw is a flat head screw configured to limit a screwing depth by clamping a screw head outside the top fixing hole.

Each of the heat dissipating profiles is provided with one top fixing hole and two bottom fixing holes.

Each of the LED lamp beads includes an RGB three-in-one lamp bead configured to separately emit red light, green light, blue light or combined light and a white light LED lamp bead configured to separately emit white light, and is controlled by the single-channel drive control IC to change different light emitting modes and colors to realize colorful light emitting and a plurality of light emitting modes.

The power supply positive electrode is used for supplying power to each of the LED lamp beads and the single-channel drive control IC, the white light control electrode is used for separately transmitting a white light control signal sent by the MCU controller and used for adjusting and controlling a switch and brightness of the white light LED lamp bead, and the signal electrode is used for transmitting a light emitting control signal sent by the MCU controller to the single-channel drive control IC to adjust and control the RGB three-in-one lamp bead.

The single-channel drive control IC is a three-channel LED drive control IC configured to separately output three independent control signals of RGB.

A voltage of the power supply positive electrode is +12 V or +24 V.

A second technical solution adopted by the present invention is as follows. The present invention includes a base, a top light emitting tube, and a drive control circuit, in which the base is provided with a bottom tube, the bottom tube and the top light emitting tube each include a heat dissipating profile and a light transmitting tube, the light transmitting tube and the heat dissipating profile are axially plugged and fixed, a strip-shaped light source plate is fixedly connected to an outer side of a bottom plate of the heat dissipating profile, the light source plate of the top light emitting tube is provided with a plurality of LED lamp beads, a bottom end of the light source plate of the top light emitting tube is provided with a male conductive terminal to form an electrical circuit with the LED lamp beads, a top end of the light source plate of the bottom tube is provided with a female conductive terminal to form an electrical circuit with the drive control circuit, the male conductive terminal is adapted to the female conductive terminal, a bottom portion of the heat dissipating profile of the top light emitting tube is provided with a bottom fixing hole, a top portion of the heat dissipating profile of the bottom tube is provided with a top fixing hole, the top light emitting tube is provided with a connecting plate, the connecting plate is adapted to an inner cavity of each of the heat dissipating profiles, an upper portion of the connecting plate extends into a bottom portion of the inner cavity of the heat dissipating profile of the top light emitting tube, and a first screw passes through the bottom fixing hole and then is connected and fixed to the connecting plate, when the top light emitting tube and the bottom tube are connected, a lower portion of the connecting plate extends into a top portion of the inner cavity of the heat dissipating profile of the bottom tube, and a second screw passes through the top fixing hole and then is connected and fixed to the connecting plate, so that the top light emitting tube and the bottom tube are combined to form a column body with the same appearance, and at the same time, the male conductive terminal of the top light emitting tube and the female conductive terminal of the bottom tube are plugged and coupled to realize electrical connection, thereby supplying power to each of the LED lamp beads, the drive control circuit includes a power input socket interface configured to connect an external low-voltage power adapter to input direct current low-voltage power and an MCU controller configured to control a light emitting state and a light emitting effect of the top light emitting tube, an output end of the MCU controller is electrically connected to the female conductive terminal of the bottom tube, and is electrically connected through the male conductive terminal of the top light emitting tube connected to the female conductive terminal of the bottom tube, the light source plate is provided with at least one single-channel drive control IC configured to drive and control the LED lamp beads of the top light emitting tube to emit light, each of the female conductive terminal and the male conductive terminal includes a four-wire power supply and control interface, and the four-wire power supply and control interface includes a power supply positive electrode, a power supply negative electrode, a white light control electrode, and a signal electrode.

The connecting plate is a profile, and a cross-sectional shape and a size of the connecting plate are adapted to a cross-sectional shape and a size of the inner cavity of the heat dissipating profile.

The drive control circuit is disposed in the base.

The power input socket interface is disposed on the base.

The base is provided with a control button configured to control the drive control circuit to control each of the light source plates to emit light.

The base is provided with a remote control receiving sensor that is controlled by a remote controller and is configured to receive a remote control sensing signal so as to control each of the light source plates to emit light and to change different light emitting modes and colors through the drive control circuit.

The drive control circuit includes an APP network control module that is controlled by a mobile phone APP and is configured to receive a network control signal and control each of the light source plates to emit light and change different light emitting modes and colors through the drive control circuit.

A top portion of the top light emitting tube is provided with a top cover.

The first screw is a set screw.

The second screw is a flat head screw configured to limit a screwing depth by clamping a screw head outside the top fixing hole.

Each of the heat dissipating profiles is provided with one top fixing hole and two bottom fixing holes.

Each of the LED lamp beads includes an RGB three-in-one lamp bead configured to separately emit red light, green light, blue light or combined light and a white light LED lamp bead configured to separately emit white light, and is controlled by the single-channel drive control IC to change different light emitting modes and colors to realize colorful light emitting and a plurality of light emitting modes.

The power supply positive electrode is used for supplying power to each of the LED lamp beads and the single-channel drive control IC, the white light control electrode is used for separately transmitting a white light control signal sent by the MCU controller and used for adjusting and controlling a switch and brightness of the white light LED lamp bead, and the signal electrode is used for transmitting a light emitting control signal sent by the MCU controller to the single-channel drive control IC to adjust and control the RGB three-in-one lamp bead.

The single-channel drive control IC is a three-channel LED drive control IC configured to separately output three independent control signals of RGB.

A voltage of the power supply positive electrode is +12 V or +24 V.

Beneficial effects of the present invention are as follows. The present invention includes a base, a top light emitting tube, a drive control circuit, or also includes a middle light emitting tube, the base is provided with a bottom tube, the bottom tube and the top light emitting tube (and the middle light emitting tube) each include a heat dissipating profile and a light transmitting tube, the light transmitting tube and the heat dissipating profile are axially plugged and fixed, a strip-shaped light source plate is fixedly connected to an outer side of a bottom plate of the heat dissipating profile, the light source plates of the top light emitting tube (and the middle light emitting tube) are each provided with a plurality of LED lamp beads, bottom ends of the light source plates of the top light emitting tube (and the middle light emitting tube) are each provided with a male conductive terminal to form an electrical circuit with the LED lamp beads, a top end of the light source plate of the bottom tube is provided with a female conductive terminal to form an electrical circuit with the drive control circuit (or a top end of the light source plate of the middle light emitting tube is also provided with a female conductive terminal to form an electrical circuit with the LED lamp beads), the male conductive terminal is adapted to the female conductive terminal, bottom portions of the heat dissipating profiles of the top light emitting tube (and the middle light emitting tube) are each provided with a bottom fixing hole, top portions of the heat dissipating profiles of the bottom tube (and the middle light emitting tube) are each provided with a top fixing hole, the top light emitting tube (and the middle light emitting tube) are each provided with a connecting plate, the connecting plate is adapted to an inner cavity of each of the heat dissipating profiles, an upper portion of the connecting plate extends into bottom portions of the inner cavities of the heat dissipating profiles of the top light emitting tube (and the middle light emitting tube), and a first screw passes through the bottom fixing hole and then is connected and fixed to the connecting plate, when connected, a lower portion of the connecting plate extends into a top portion of the inner cavity of the heat dissipating profile of the bottom tube, and a second screw passes through the top fixing hole and then is connected and fixed to the connecting plate (or a lower portion of the connecting plate at a bottom portion of the top light emitting tube or the middle light emitting tube positioned above extends into a top portion of the inner cavity of the heat dissipating profile of the middle light emitting tube or the bottom tube positioned below the top light emitting tube or the middle light emitting tube, and a second screw passes through the top fixing hole and then is connected and fixed to the connecting plate), so that the top light emitting tube, (each of the middle light emitting tubes and) the bottom tube are connected and combined in sequence to form a column body with the same appearance, and at the same time, the male conductive terminals and the female conductive terminals, which are vertically adjacent to each other, of the top light emitting tube, (each of the middle light emitting tubes and), and the bottom tube are plugged and coupled to realize electrical connection, thereby supplying power to each of the LED lamp beads, the drive control circuit includes a power input socket interface configured to connect an external low-voltage power adapter to input direct current low-voltage power and an MCU controller configured to separately control a light emitting state and a light emitting effect for (each of the middle light emitting tubes and) the top light emitting tube, an output end of the MCU controller is electrically connected to the female conductive terminal of the bottom tube, and is electrically connected in sequence through the male conductive terminal (and the female conductive terminal) of (each of the middle light emitting tubes and) the top light emitting tube connected to the female conductive terminal of the bottom tube in sequence, each of the light source plates is provided with at least one single-channel drive control IC configured to drive and control the LED lamp beads of (each of the middle light emitting tubes and) the top light emitting tube to emit light, each of the female conductive terminals and the male conductive terminals includes a four-wire power supply and control interface, and the four-wire power supply and control interface includes a power supply positive electrode, a power supply negative electrode, a white light control electrode, and a signal electrode. Therefore, the present invention overcomes defects and shortcomings in the related art, by disposing light emitting parts in a segmented manner, it is not only easy to assemble and disassemble, but also realizes effective, fast, and stable connection of the circuit while cleverly realizing structural assembly, the circuit connection spliced in a segmented manner is simpler and the stability is easily guaranteed, thereby ensuring the continuity and stability of a lighting effect. In addition, most of the parts of the segmented parts have the same specifications and can be used universally, so that the number of specifications of spare parts is reduced, which is convenient for segmented manufacturing and segmented assembly, thereby improving production efficiency. After segmentation, the length and volume can be reduced, which is convenient for storage, packaging, and transportation, and reduces the packaging volume, and the assembly is fast and convenient. The connecting plate is adapted to the inner cavity of each of the heat dissipating profiles, and the connecting plate is connected to the segmented parts respectively by screws, which is convenient and stable, and the structural stability of the lamp and the linear verticality of the appearance are good. By adopting the middle light emitting tube, the number of the middle light emitting tubes can be further increased or decreased according to the needs, which is not only easy to change and assemble, but also can achieve lighting effects in different lighting ranges and adjust a light emitting height. A customer can make more independent selections in a do-it-yourself (DIY) manner and can independently adjust the lighting range, which has the advantages of being more flexible and convenient for both atmosphere lighting and ordinary lighting. Spliced light source plates are directly connected through the male conductive terminals and the female conductive terminals, which reduces an extra space occupied between the light source plates that emit light and solves a problem of shadows caused by large gaps between the light emitting bodies of a spliced lamp post, and thus a rod-shaped light emitting body spliced in a segmented manner has no difference in appearance and light emitting effect from a unitary lamp body, thereby achieving a beautiful and firm effect. By arranging a four-wire power supply and control interface at each of the female conductive terminals and the male conductive terminals, a power supply and control circuit network in a form of a parallel circuit structure is formed between the spliced light emitting units, so that the voltage consistency of each light emitting unit is good, avoiding the difference in light emitting effect caused by voltage inconsistency, and the light emitting effect is good, and when the number of light emitting units is increased or decreased, the voltage consistency will not be affected. By arranging at least one single-channel drive control IC on the light source plate, the MCU controller can send independent drive control digital signals to each LED light emitting unit through the white light control electrode and the signal electrode, thereby realizing independent control of the light emission of each light emitting unit, and enriching the light emitting modes and effects of the entire lamp, and therefore, the present invention is a floor atmosphere lamp which is easy to assemble and disassemble, stable in connection, convenient to transport and store, saves packaging volume, has a small number of spare part specifications, and high in production efficiency. The floor atmosphere lamp is easy to splice and control, high in structural stability and circuit connection stability after splicing, not easy to be damaged, can be independently controlled in a segmented manner, light emitting units can be freely increased or decreased, the appearance consistency of a spliced lamp body and a unitary light emitting body is high, and the voltage consistency of each light emitting unit is high, the light emitting effect is consistent, no dark area is generated, and continuity and stability of a lighting effect are high.

Each of the LED lamp beads includes an RGB three-in-one lamp bead configured to separately emit red light, green light, blue light or combined light and a white light LED lamp bead configured to separately emit white light, and is controlled by the single-channel drive control IC to change different light emitting modes and colors to realize colorful light emitting and a plurality of light emitting modes. The power supply positive electrode is used for supplying power to each of the LED lamp beads and the single-channel drive control IC, the white light control electrode is used for separately transmitting a white light control signal sent by the MCU controller and used for adjusting and controlling a switch and brightness of the white light LED lamp bead, and the signal electrode is used for transmitting a light emitting control signal sent by the MCU controller to the single-channel drive control IC to adjust and control the RGB three-in-one lamp bead. The single-channel drive control IC is a three-channel LED drive control IC configured to separately output three independent control signals of RGB. In the present invention, the RGB three-in-one lamp bead and the white light LED lamp bead are independent from each other and are controlled independently and separately, the independent white light LED lamp bead has a higher brightness, which makes the white light color purer, and thus the present invention achieves a light emitting effect of an independent white light LED lamp bead, and is easy to control.

DESCRIPTION OF THE EMBODIMENTS

First Embodiment

Figure 1:
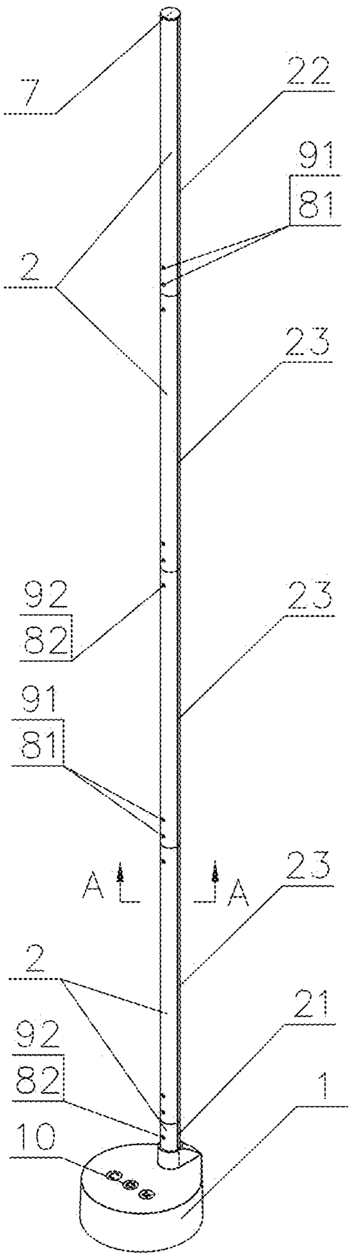
FIG. 1 is a schematic diagram of an overall structure of a floor atmosphere lamp according to a first embodiment of the present invention.
Figure 2:
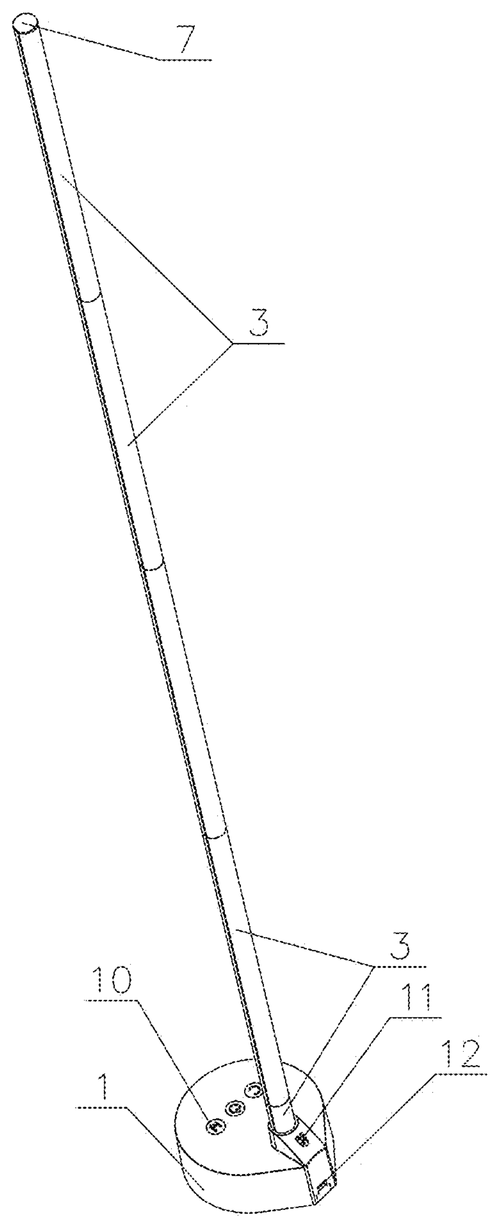
FIG. 2 is a schematic diagram of the overall structure of the floor atmosphere lamp according to the first embodiment of the present invention from another perspective.
Figure 3:
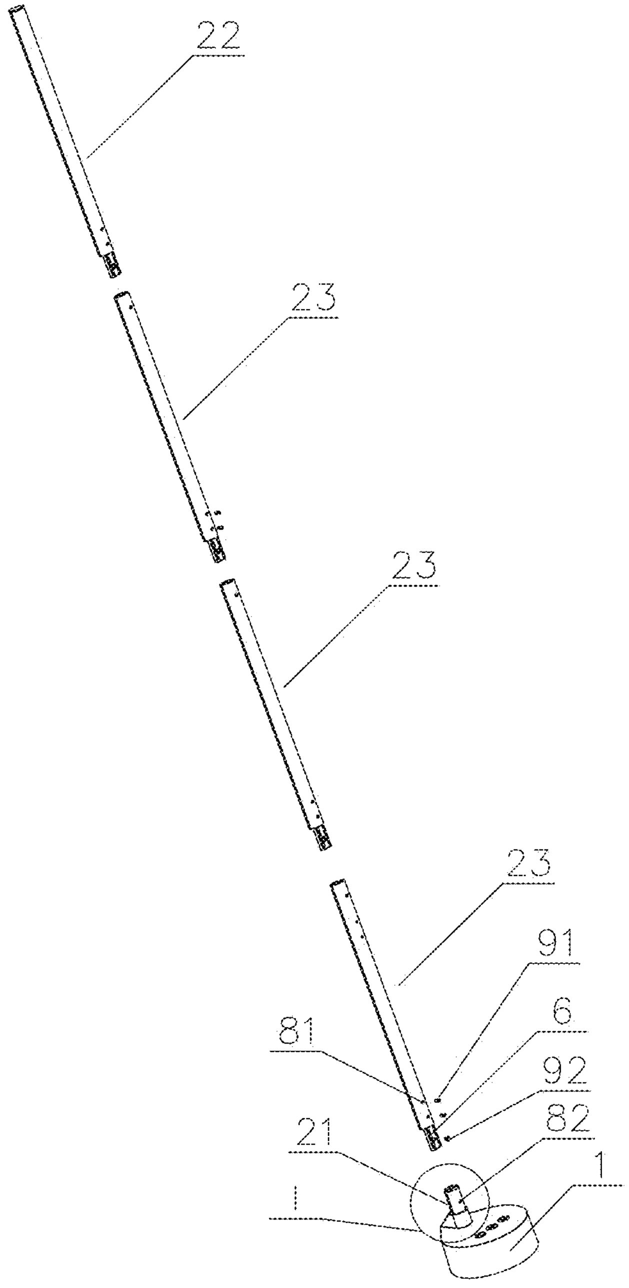
FIG. 3 is a schematic diagram of an exploded structure of main structural components of the floor atmosphere lamp according to the first embodiment of the present invention.
Figure 4:
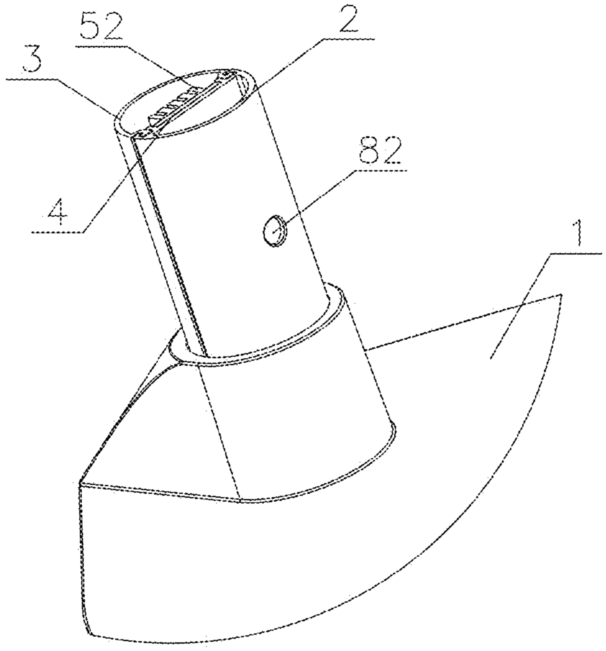
FIG. 4 is a schematic diagram of an enlarged structure of I illustrated in FIG. 3.
Figure 5:
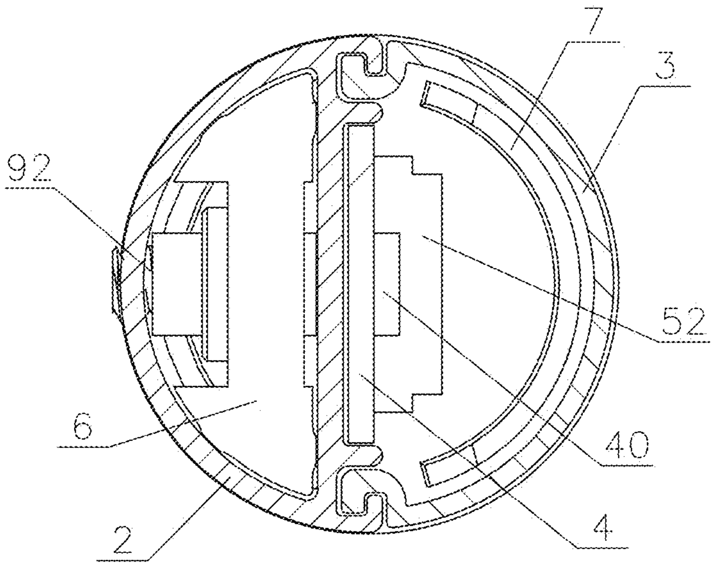
FIG. 5 is a schematic diagram of a cross-sectional structure of an A-A section illustrated in FIG. 1.
Figure 6:
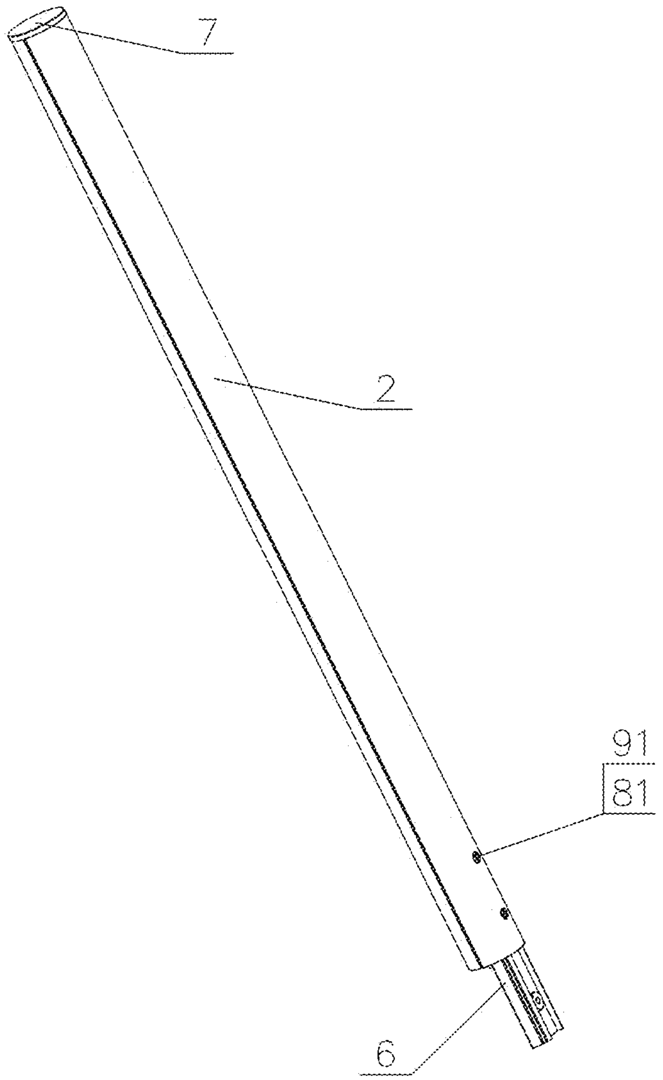
FIG. 6 is a schematic structural diagram of a top light emitting tube according to an embodiment of the present invention.
Figure 7:
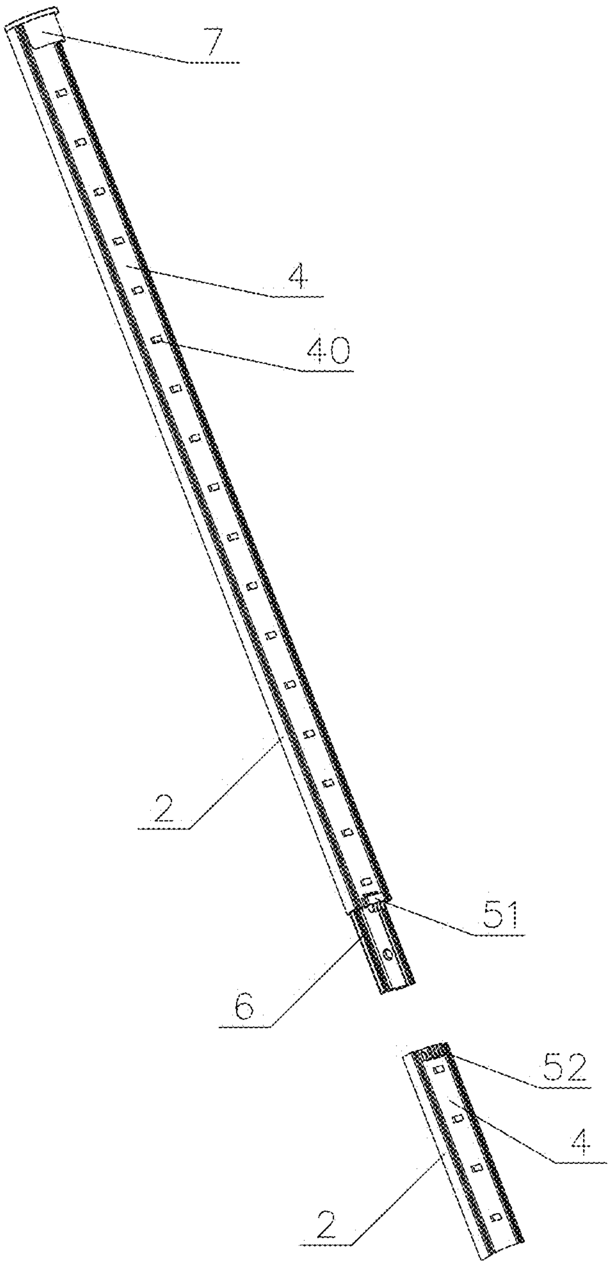
FIG. 7 is a schematic diagram of a connection structure between the top light emitting tube and a middle light emitting tube after a light transmitting tube is removed according to the first embodiment of the present invention.
Figure 8:
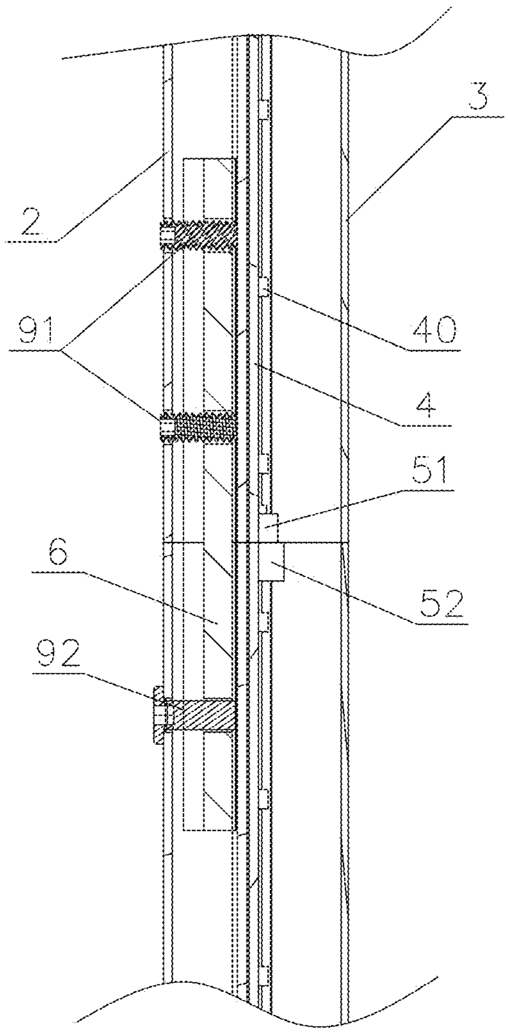
FIG. 8 is a schematic diagram of a longitudinal section structure of a connection between the top light emitting tube and the middle light emitting tube or between two middle light emitting tubes according to the first embodiment of the present invention.
Figure 9:
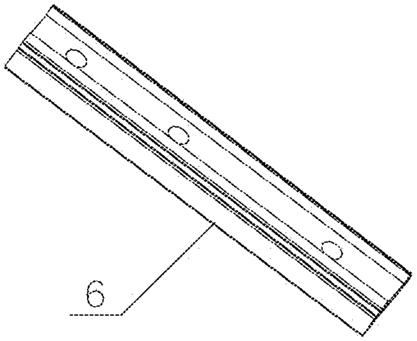
FIG. 9 is a schematic structural diagram of a connecting plate according to the embodiment of the present invention.

As illustrated in FIGS. 1 to 13, a floor atmosphere lamp according to the present embodiment includes a base 1, a top light emitting tube 22, three middle light emitting tubes 23, and a drive control circuit, the base 1 is provided with a bottom tube 21, the bottom tube 21, the middle light emitting tube 23, and the top light emitting tube 22 each include a heat dissipating profile 2 and a light transmitting tube 3, the light transmitting tube 3 and the heat dissipating profile 2 are axially plugged and fixed, which not only meets the requirements of light transmission and light emission, but also improves the heat dissipation performance. The heat dissipating profile 2 is made of aluminum, and the light transmitting tube 3 is made of PC or other plastic materials, which has good structural strength, is durable, and has a low cost. A strip-shaped light source plate 4 is fixedly connected to an outer side of a bottom plate of the heat dissipating profile 2, the light source plates 4 of the top light emitting tube 22 and the middle light emitting tube 23 are each provided with a plurality of LED lamp beads 40, bottom ends of the light source plates 4 of the top light emitting tube 22 and the middle light emitting tube 23 are each provided with a male conductive terminal 51 to form an electrical circuit with the LED lamp beads 40, a top end of the light source plate 4 of the bottom tube 21 is provided with a female conductive terminal 52 to form an electrical circuit with the drive control circuit, a top end of the light source plate 4 of the middle light emitting tube 23 is provided with the female conductive terminal 52 to form an electrical circuit with the LED lamp beads 40, the male conductive terminal 51 is adapted to the female conductive terminal 52, a bottom portion of each of the heat dissipating profiles 2 of the top light emitting tube 22 and the middle light emitting tube 23 is provided with a bottom fixing hole 81, a top portion of each of the heat dissipating profiles 2 of the bottom tube 21 and the middle light emitting tube 23 is provided with a top fixing hole 82, the top light emitting tube 22 and each of the middle light emitting tubes 23 are each provided with a connecting plate 6, the connecting plate 6 is adapted to an inner cavity of each of the heat dissipating profiles 2, an upper portion of the connecting plate 6 extends into a bottom portion of the inner cavity of the heat dissipating profile 2 of the top light emitting tube 22 or the middle light emitting tube 23, and a first screw 91 passes through the bottom fixing hole 81 and then is connected and fixed to the connecting plate 6, when the top light emitting tube 22, the middle light emitting tube 23, and the bottom tube 21 are connected in sequence, a lower portion of the connecting plate 6 at a bottom portion of the top light emitting tube 22 or the middle light emitting tube 23 positioned above extends into a top portion of the inner cavity of the heat dissipating profile 2 of the middle light emitting tube 23 or the bottom tube 21 positioned below the top light emitting tube 22 or the middle light emitting tube 23, and a second screw 92 passes through the top fixing hole 82 and then is connected and fixed to the connecting plate 6, so that the top light emitting tube 22, each of the middle light emitting tubes 23, and the bottom tube 21 are connected and combined in sequence to form a column body with the same appearance, and at the same time, the male conductive terminals 51 and the female conductive terminals 52, which are vertically adjacent to each other, of the top light emitting tube 22, each of the middle light emitting tubes 23, and the bottom tube 21 are plugged and coupled to realize electrical connection, thereby supplying power to each of the LED lamp beads 40, and finally, a segmented, combination variable, and detachable vertical rod-shaped light emitting body is formed.

Specifically, the connecting plate 6 is a profile, and a cross-sectional shape and a size of the connecting plate 6 are adapted to a cross-sectional shape and a size of the inner cavity of the heat dissipating profile 2, an outer contour of the cross-sectional shape of the connecting plate 6 is substantially consistent with the cross-sectional shape of the inner cavity of the heat dissipating profile 2, and the connecting plate 6 abuts against the inner cavity of the heat dissipating profile 2 after being inserted into the inner cavity of the heat dissipating profile 2, thereby preventing circumferential rotation, having a good limiting effect, and achieving a firm connection. The drive control circuit is disposed in the base 1, the drive is built-in, and the thus appearance is beautiful and simple. The present embodiment is a low-voltage LED lamp with high safety. In the present embodiment, the base 1 is in a circular truncated cone shape as a whole, and thus the present embodiment can be placed in a corner to provide atmosphere lighting for the corner or the surrounding area, and does not occupy space and has good adaptability to the corner, and thus the present embodiment can be used as a corner lamp. Of course, the base 1 may also be in other shapes as a whole, such as a water drop shape. The base 1 is provided with a control button 61 configured to control the drive control circuit to control each of the light source plates 4 to emit light, so as to facilitate the control of the main body. A top portion of the top light emitting tube 22 is provided with a top cover 7, which is beautiful and dustproof. The first screw 91 is a set screw, has no head, and has a beautiful appearance. The second screw 92 is a flat head screw configured to limit a screwing depth by clamping a screw head outside the top fixing hole 82, which is convenient for operation during installation and avoids damage caused by over-screwing. Each of the heat dissipating profiles 2 is provided with one top fixing hole 82 and two bottom fixing holes 81, and thus the overall connection structure is stable.

The drive control circuit includes a power input socket interface 12 configured to connect an external low-voltage power adapter to input direct current low-voltage power and an MCU controller U10 configured to separately control a light emitting state and a light emitting effect one by one for each of the middle light emitting tubes 23 and the top light emitting tube 22, the power input socket interface 12 may be a power adapter socket, or a USB Type-C interface, or the like. An output end of the MCU controller U10 is electrically connected to the female conductive terminal 52 of the bottom tube 21, and is electrically connected in sequence through the male conductive terminal 51 and the female conductive terminal 52 of each of the middle light emitting tubes 23 and the top light emitting tube 22 connected to the female conductive terminal 52 of the bottom tube 21 in sequence, and in the present embodiment, each of the middle light emitting tubes 23 and the top light emitting tube 22 are identical except for the top cover 7 at the top portion and the female conductive terminal 52, there are three light source plates 4 inside each of the middle light emitting tubes 23 and the top light emitting tube 22, and the light source plates 4 are connected in parallel between the male conductive terminal 51 and the female conductive terminal 52 of a present segment, each of the light source plates 4 is provided with one single-channel drive control IC U1B, U2B, U3B configured to drive and control the LED lamp beads 40 of each of the middle light emitting tubes 23 and the top light emitting tube 22 to emit light, each of the female conductive terminals 52 and the male conductive terminals 51 includes a four-wire power supply and control interface J1, J4, and the four-wire power supply and control interface J1, J4 includes a power supply positive electrode VCC, a power supply negative electrode GND, a white light control electrode W−, and a signal electrode DI.

Figure 10:
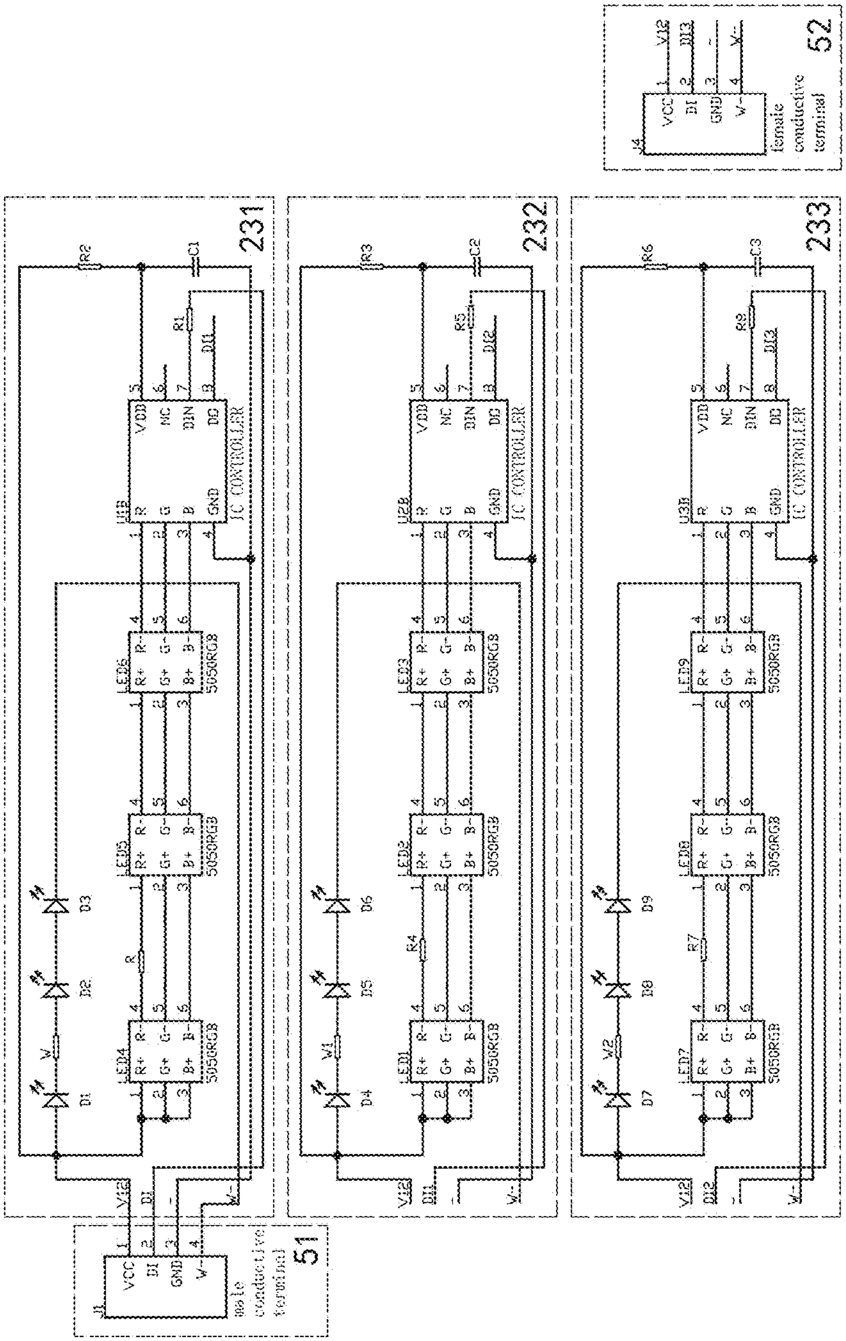
FIG. 10 is a schematic diagram of a circuit structure of the middle light emitting tube according to the first embodiment of the present invention.
Figure 11:
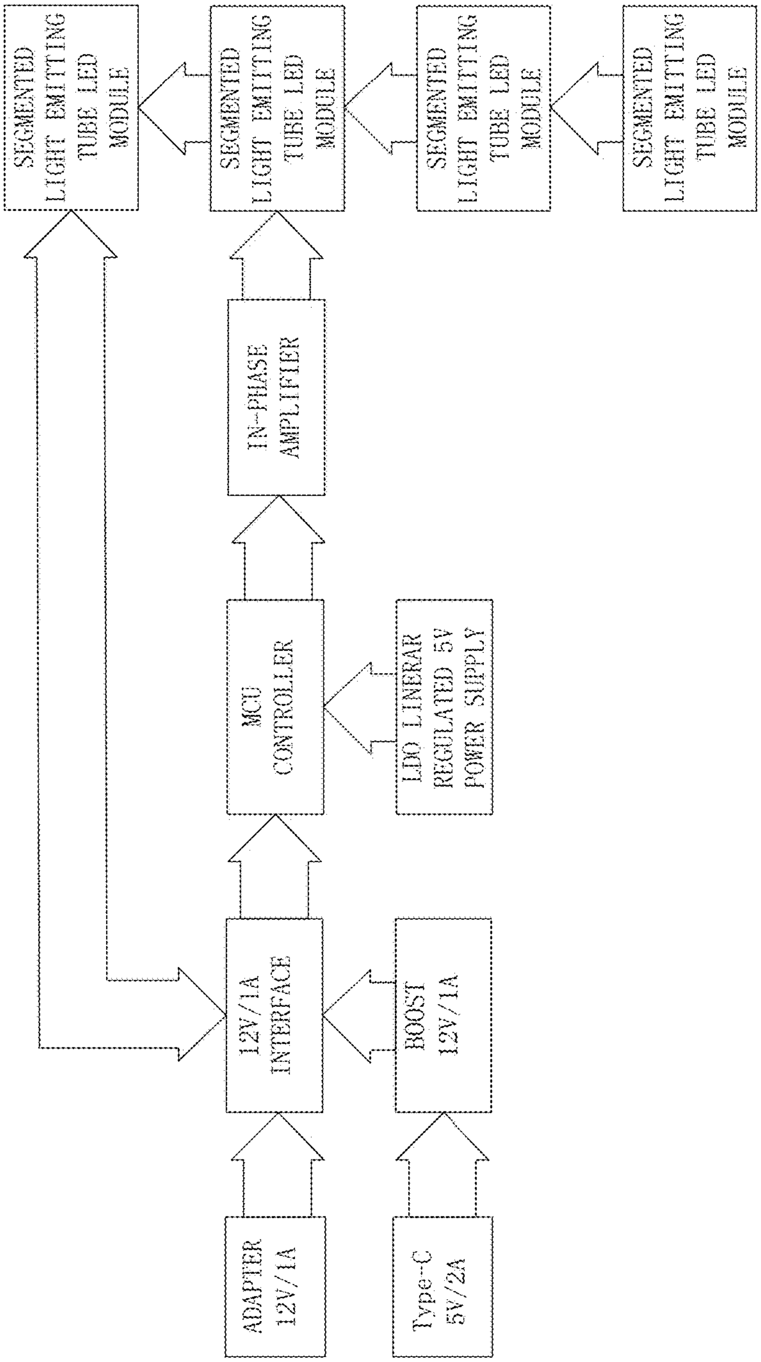
FIG. 11 is a schematic diagram illustrating an overall circuit connection principle according to the first embodiment of the present invention.

Specifically, as illustrated in FIG. 10, the LED lamp bead 40 includes an RGB three-in-one lamp bead configured to separately emit red light, green light, blue light or combined light and a white light LED lamp bead configured to separately emit white light, and is controlled by the single-channel drive control IC U1B, U2B, U3B to change different light emitting modes and colors to realize colorful light emitting and a plurality of light emitting modes. In the present embodiment, each of the light source plates 4 is provided with three RGB three-in-one lamp beads 5050RGB connected in series and three white light LED lamp beads D1, D2, D3 connected in series. That is, in the present embodiment, each of the middle light emitting tubes 23 and the top light emitting tube 22 includes three light source plates 4 to form three groups of parallel multicolor light sources, and each group of multicolor light sources includes three series-connected RGB three-in-one lamp bead groups and three series-connected white light LED lamp bead groups. The power supply positive electrode VCC is used for supplying power to each of the LED lamp beads 40 and the single-channel drive control IC U1B, U2B, U3B, the white light control electrode W− is used for separately transmitting a white light control signal sent by the MCU controller U10 and used for adjusting and controlling a switch and brightness of the white light LED lamp bead, and the signal electrode DI is used for transmitting a light emitting control signal sent by the MCU controller U10 to the single-channel drive control IC U1B, U2B, U3B to adjust and control the RGB three-in-one lamp bead. The single-channel drive control IC is a three-channel LED drive control IC configured to separately output three independent control signals of RGB. In the present embodiment, the voltage of the power supply positive electrode VCC is +12 V, and of course the voltage may also be other common standard low voltages such as +24 V, or other human body safe direct current voltages less than +36 V. In the present invention, the RGB three-in-one lamp bead and the white light LED lamp bead are independent from each other and are controlled independently and separately, the independent white light LED lamp bead has a higher brightness, which makes the white light color purer, and thus the present invention achieves a light emitting effect of an independent white light LED lamp bead, and is easy to control. A separate white light LED lamp bead chip can be used for wall washing and lighting, and is not limited to atmosphere lighting.

The base 1 is provided with a remote control receiving sensor 11 that is controlled by a remote controller and is configured to receive a remote control sensing signal so as to control each of the light source plates 4 to emit light and to change different light emitting modes and colors through the drive control circuit, the remote control receiving sensor 11 can be controlled by infrared, or by a 2.4 G remote controller, which is convenient to connect, and has a long distance, a strong ability to pass through obstacles, and a large control range. Of course, other wireless control devices such as WIFI or Bluetooth may also be used. The drive control circuit includes an APP network control module that is controlled by a mobile phone APP and is configured to receive a network control signal and remotely and intelligently control each of the light source plates 4 to emit light and change different light emitting modes and colors through the drive control circuit, thereby realizing the effect of the LED lamp bead 40 emitting RGB+W+magic light. A voice control device may also be set in the drive control circuit to achieve the effect of light moving with a music rhythm through voice control. Through the control of the drive control circuit, a basic function of adjusting the color and brightness of the light can also be achieved, thereby realizing intelligent atmosphere lighting. The above control parts are all existing techniques in this field and will not be repeated here.

Figure 12:
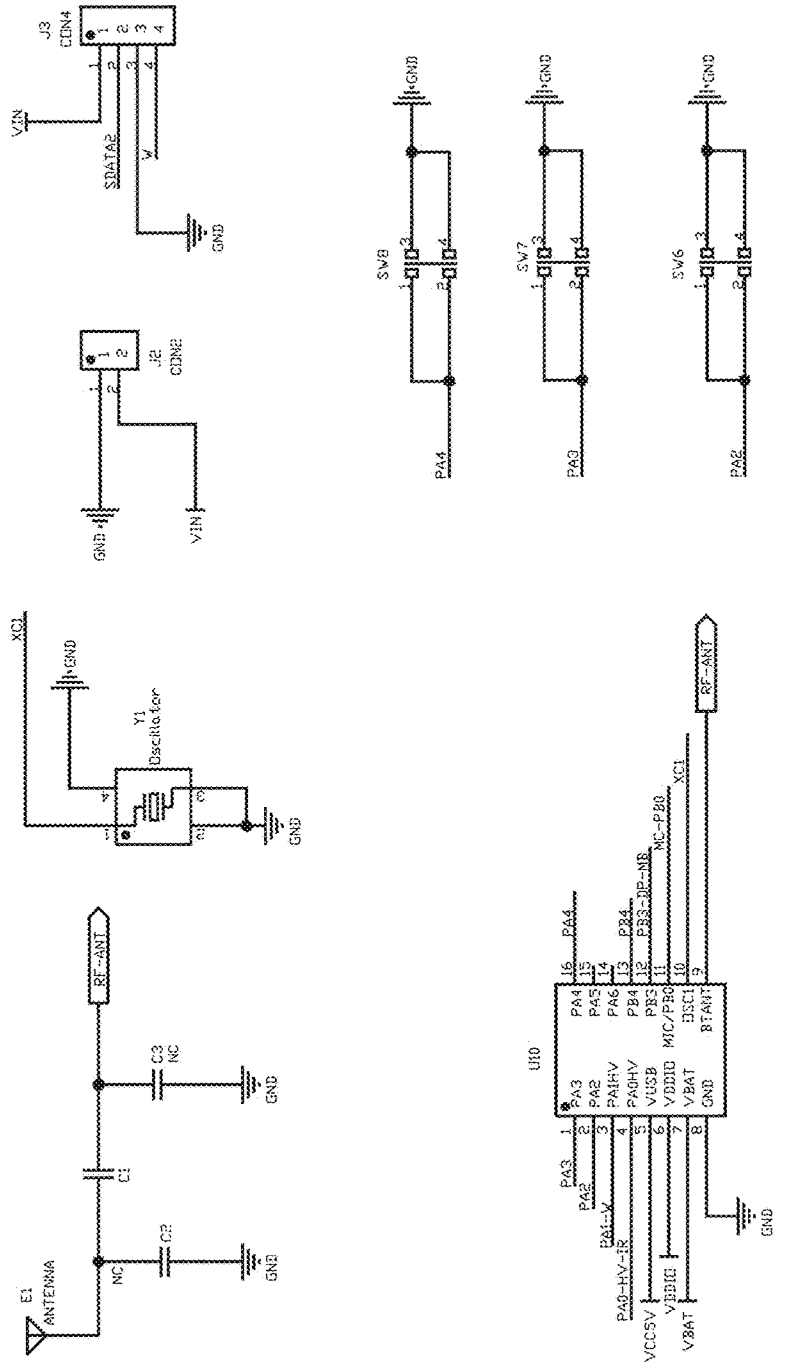
FIG. 12 and FIG. 13 are each a schematic diagram of a circuit structure of a drive control circuit according to the embodiment of the present invention.
Figure 13:
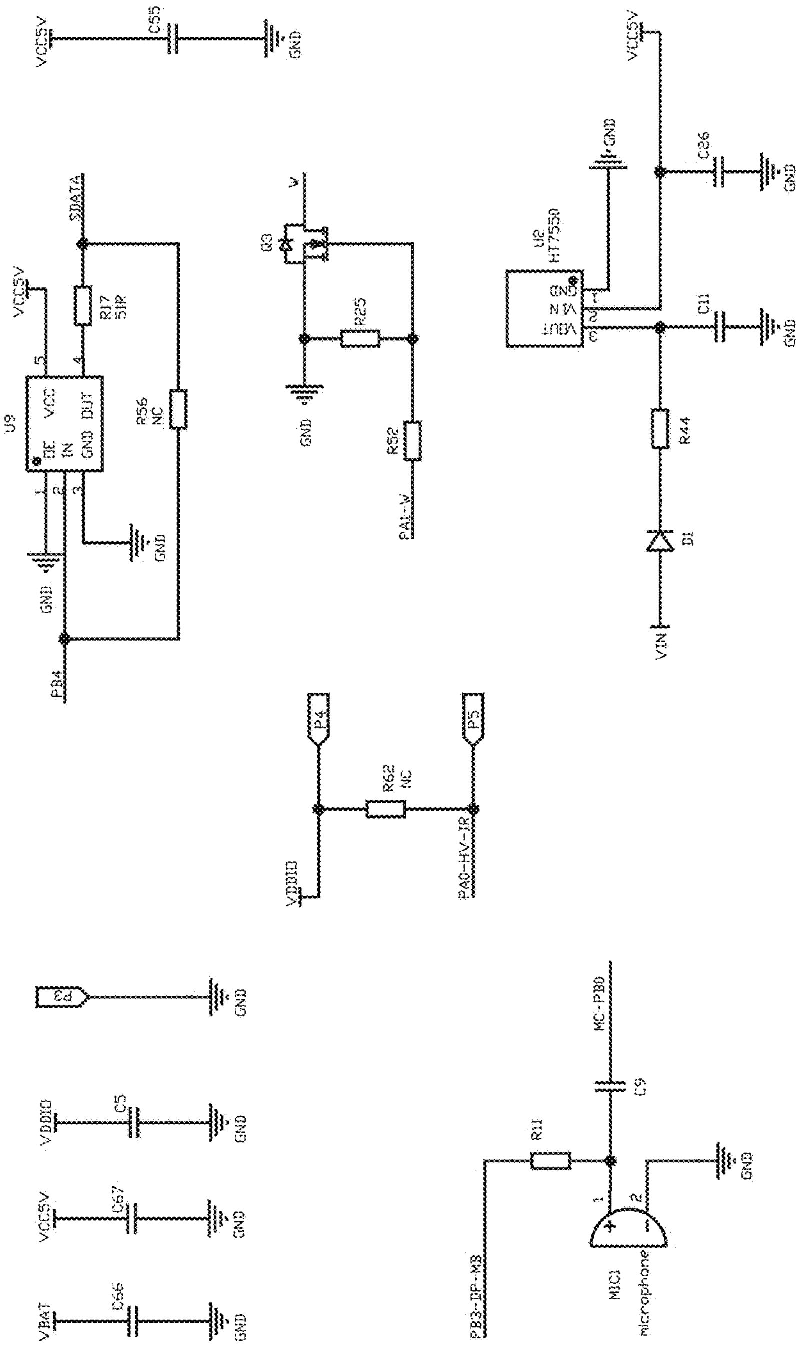

Referring to FIGS. 12 and 13, in the present embodiment, the circuit driven and controlled by MCU-APP is described as follows.

(i). All control functions are processed by the MCU U10.

(ii). C66, C67, C5, and C55 are filter capacitors of MCU-VDD5V, VDIO, and VBAT, which are used for preventing clutter interference.

(iii). R11, C9, MIC2, and MIC1 form a microphone sensing circuit, which is used for control a light sensing change mode according to a tone.

(iv). U2, D1, R44, C11, and C26 form a linear voltage regulator circuit that reduces 12 V to 5 V, which is used for providing a stable power supply voltage to the MCU.

(v). Q3, R25, and R52 form a switching circuit for W-warm light controlled by the MCU.

(vi). U9, R56, and R17 form an in-phase amplifier to increase a drive capability of a signal of the MCU. The SDATA port signal needs to drive a plurality of cascaded chips, whereas a direct drive signal from the MCU is relatively weak, and therefore needs to be amplified.

(vii). Y1 and XC1 form a passive crystal oscillator circuit with an external frequency of 24 MHz to ensure that the amplifier works in a high-gain linear region to enable the MCU performing precise control.

(viii). J2 CON2 is a power adapter interface of 12 V.

(ix). J3 CON4 is an MCU control board and segment module port, and the SDATA interfaces with the DIN for control.

(x). C1, C2, C3, and ANTENN form an antenna receiving circuit for sending and receiving wireless control signals.

(xi). SW8, SW7, and SW6 are respectively 1 control on and off, 2 manual switch light mode, and 3 microphone mode, and high and low levels of the buttons are identified so as to be used for starting and closing.

(xii). The MCU circuit has a powerful conversion capability, can switch between seven different colors for simultaneous dimming, has dozens of built-in working modes, has dozens of built-in music playback, can set timing, microphone recording mode and the like.

In the present embodiment, the middle light emitting tubes 23 are completely the same, the top light emitting tube 22 is different from the middle light emitting tubes 23 only in that the top portion is slightly different, and the light emitting tubes share the same heat dissipating profile 2, the light transmitting tube 3, the light source plate 4, the LED lamp bead 40, the male conductive terminal 51, the female conductive terminal 52, the first screw 91, the second screw 92, and the connecting plate 6, and thus the present embodiment is a modular lamp with universal parts, which greatly reduces the cost of material preparation, inventory, and the like of the lamp. In terms of structure and circuit, the present invention is not only easy to use with different powers and irradiation ranges, but also realizes the modularization and versatility of the main components, is easy to prepare materials, saves the types of materials and production costs, is easy to DIY, and achieves a win-win situation for users and manufacturers.

Of course, the present embodiment can be used not only as a corner lamp, but also as a bedside lamp, a table lamp, a night lamp, and the like.

Second Embodiment

The floor atmosphere lamp according to the present embodiment is different from that of the first embodiment in the following. In the present embodiment, the middle light emitting tubes 23 in the first embodiment are removed, the top light emitting tube 22 is directly connected with the bottom tube 21, that is, the present embodiment includes only one segment of the light emitting body. When the top light emitting tube 22 is connected to the bottom tube 21 after the connecting plate 6 is connected and fixed to the heat dissipating profile 2 of the top light emitting tube 22 by the first screw 91, the lower portion of the connecting plate 6 extends into the top portion of the inner cavity of the heat dissipating profile 2 of the bottom tube 21, and the second screw 92 passes through the top fixing hole 82 and then is connected and fixed to the connecting plate 6, so that the top light emitting tube 22 and the bottom tube 21 are combined to form a column body with the same appearance, and at the same time, the male conductive terminal 51 of the top light emitting tube 22 and the female conductive terminal 52 of the bottom tube 21 are plugged and coupled to realize electrical connection, thereby supplying power to each of the LED lamp beads 40.

That is, the present embodiment realizes a minimum number of light emitting components, which makes the volume smaller and suitable for use as a desk lamp or the like.

The remaining features of the present embodiment are the same as those of the first embodiment.

The above embodiments are merely illustrative of the present invention and are not intended to limit the protection scope of the present invention. For example, the number of the middle light emitting tubes 23 is theoretically unlimited, and light emitting units can be combined for different numbers as needed, thereby achieving the use with different powers and irradiation ranges, while the materials are the same, which greatly saves the material preparation and production costs. Both users and manufacturers achieve a win-win situation.

Therefore, the present invention overcomes defects and shortcomings in the related art, by disposing light emitting parts in a segmented manner, it is not only easy to assemble and disassemble, but also realizes effective, fast, and stable connection of the circuit while cleverly realizing structural assembly, the circuit connection spliced in a segmented manner is simpler and the stability is easily guaranteed, thereby ensuring the continuity and stability of a lighting effect. In addition, most of the parts of the segmented parts have the same specifications and can be used universally, so that the number of specifications of spare parts is reduced, which is convenient for segmented manufacturing and segmented assembly, thereby improving production efficiency. After segmentation, the length and volume can be reduced, which is convenient for storage, packaging, and transportation, and reduces the packaging volume, and the assembly is fast and convenient. The connecting plate is adapted to the inner cavity of each of the heat dissipating profiles, and the connecting plate is connected to the segmented parts respectively by screws, which is convenient and stable, and the structural stability of the lamp and the linear verticality of the appearance are good. By adopting the middle light emitting tube, the number of the middle light emitting tubes can be further increased or decreased according to the needs, which is not only easy to change and assemble, but also can achieve lighting effects in different lighting ranges and adjust a light emitting height. A customer can make more independent selections in a do-it-yourself (DIY) manner and can independently adjust the lighting range, which has the advantages of being more flexible and convenient for both atmosphere lighting and ordinary lighting. Spliced light source plates are directly connected through the male conductive terminals and the female conductive terminals, which reduces an extra space occupied between the light source plates that emit light and solves a problem of shadows caused by large gaps between the light emitting bodies of a spliced lamp post, and thus a rod-shaped light emitting body spliced in a segmented manner has no difference in appearance and light emitting effect from a unitary lamp body, thereby achieving a beautiful and firm effect. By arranging a four-wire power supply and control interface at each of the female conductive terminals and the male conductive terminals, a power supply and control circuit network in a form of a parallel circuit structure is formed between the spliced light emitting units, so that the voltage consistency of each light emitting unit is good, avoiding the difference in light emitting effect caused by voltage inconsistency, and the light emitting effect is good, and when the number of light emitting units is increased or decreased, the voltage consistency will not be affected. By arranging at least one single-channel drive control IC on the light source plate, the MCU controller can send independent drive control digital signals to each LED light emitting unit through the white light control electrode and the signal electrode, thereby realizing independent control of the light emission of each light emitting unit, and enriching the light emitting modes and effects of the entire lamp, and therefore, the present invention is a floor atmosphere lamp which is easy to assemble and disassemble, stable in connection, convenient to transport and store, saves packaging volume, has a small number of spare part specifications, and high in production efficiency. The floor atmosphere lamp is easy to splice and control, high in structural stability and circuit connection stability after splicing, not easy to be damaged, can be independently controlled in a segmented manner, light emitting units can be freely increased or decreased, the appearance consistency of a spliced lamp body and a unitary light emitting body is high, and the voltage consistency of each light emitting unit is high, the light emitting effect is consistent, no dark area is generated, and continuity and stability of a lighting effect are high.

The present invention can be widely used in the field of lamps.

What is claimed is:

1. A floor atmosphere lamp comprising:

a base (1), a top light emitting tube (22), at least one middle light emitting tube (23), and a drive control circuit, wherein the base (1) is provided with a bottom tube (21), the bottom tube (21), the middle light emitting tube (23), and the top light emitting tube (22) each include a heat dissipating profile (2) and a light transmitting tube (3), the light transmitting tube (3) and the heat dissipating profile (2) are axially plugged and fixed, a strip-shaped light source plate (4) is fixedly connected to an outer side of a bottom plate of the heat dissipating profile (2), the light source plates (4) of the top light emitting tube (22) and the middle light emitting tube (23) are each provided with a plurality of LED lamp beads (40), bottom ends of the light source plates (4) of the top light emitting tube (22) and the middle light emitting tube (23) are each provided with a male conductive terminal (51) to form an electrical circuit with the LED lamp beads (40), a top end of the light source plate (4) of the bottom tube (21) is provided with a female conductive terminal (52) to form an electrical circuit with the drive control circuit, a top end of the light source plate (4) of the middle light emitting tube (23) is provided with the female conductive terminal (52) to form an electrical circuit with the LED lamp beads (40), the male conductive terminal (51) is adapted to the female conductive terminal (52), a bottom portion of each of the heat dissipating profiles (2) of the top light emitting tube (22) and the middle light emitting tube (23) is provided with a bottom fixing hole (81), a top portion of each of the heat dissipating profiles (2) of the bottom tube (21) and the middle light emitting tube (23) is provided with a top fixing hole (82), the top light emitting tube (22) and each of the middle light emitting tubes (23) are each provided with a connecting plate (6), the connecting plate (6) is adapted to an inner cavity of each of the heat dissipating profiles (2), an upper portion of the connecting plate (6) extends into a bottom portion of the inner cavity of the heat dissipating profile (2) of the top light emitting tube (22) or the middle light emitting tube (23), and a first screw (91) passes through the bottom fixing hole (81) and then is connected and fixed to the connecting plate (6), when the top light emitting tube (22), the middle light emitting tube (23), and the bottom tube (21) are connected in sequence, a lower portion of the connecting plate (6) at a bottom portion of the top light emitting tube (22) or the middle light emitting tube (23) positioned above extends into a top portion of the inner cavity of the heat dissipating profile (2) of the intermediate light emitting tube (23) or the bottom tube (21) positioned below the top light emitting tube (22) or the intermediate light emitting tube (23), and a second screw (92) passes through the top fixing hole (82) and then is connected and fixed to the connecting plate (6), so that the top light emitting tube (22), each middle light emitting tube (23), and the bottom tube (21) are connected and combined in sequence to form a column body with the same appearance, and at the same time, the male conductive terminals (51) and the female conductive terminals (52), which are vertically adjacent to each other, of the top light emitting tube (22), each of the middle light emitting tubes (23), and the bottom tube (21) are plugged and coupled to realize electrical connection, thereby supplying power to each of the LED lamp beads (40), and the drive control circuit includes a power input socket interface (12) configured to connect an external low-voltage power adapter to input direct current low-voltage power and an MCU controller configured to separately control a light emitting state and a light emitting effect one by one for each of the middle light emitting tubes (23) and the top light emitting tube (22), an output end of the MCU controller is electrically connected to the female conductive terminal (52) of the bottom tube (21), and is electrically connected in sequence through the male conductive terminal (51) and the female conductive terminal (52) of each of the middle light emitting tubes (23) and the top light emitting tube (22) connected to the female conductive terminal (52) of the bottom tube (21) in sequence, each of the light source plates (4) is provided with at least one single-channel drive control IC (U1B) configured to drive and control the LED lamp beads (40) of each of the middle light emitting tubes (23) and the top light emitting tube (22) to emit light, each of the female conductive terminals (52) and the male conductive terminals (51) includes a four-wire power supply and control interface (J1, J4), and the four-wire power supply and control interface (J1, J4) includes a power supply positive electrode (VCC), a power supply negative electrode (GND), a white light control electrode (W−), and a signal electrode (DI).

2. A floor atmosphere lamp comprising:

a base (1), a top light emitting tube (22), and a drive control circuit, wherein the base (1) is provided with a bottom tube (21), the bottom tube (21) and the top light emitting tube (22) each include a heat dissipating profile (2) and a light transmitting tube (3), the light transmitting tube (3) and the heat dissipating profile (2) are axially plugged and fixed, a strip-shaped light source plate (4) is fixedly connected to an outer side of a bottom plate of the heat dissipating profile (2), the light source plate (4) of the top light emitting tube (22) is provided with a plurality of LED lamp beads (40), a bottom end of the light source plate (4) of the top light emitting tube (22) is provided with a male conductive terminal (51) to form an electrical circuit with the LED lamp beads (40), a top end of the light source plate (4) of the bottom tube (21) is provided with a female conductive terminal (52) to form an electrical circuit with the drive control circuit, the male conductive terminal (51) is adapted to the female conductive terminal (52), a bottom portion of the heat dissipating profile (2) of the top light emitting tube (22) is provided with a bottom fixing hole (81), a top portion of the heat dissipating profile (2) of the bottom tube (21) is provided with a top fixing hole (82), the top light emitting tube (22) is provided with a connecting plate (6), the connecting plate (6) is adapted to an inner cavity of each of the heat dissipating profiles (2), an upper portion of the connecting plate (6) extends into a bottom portion of the inner cavity of the heat dissipating profile (2) of the top light emitting tube (22), and a first screw (91) passes through the bottom fixing hole (81) and then is connected and fixed to the connecting plate (6), when the top light emitting tube (22) and the bottom tube (21) are connected, a lower portion of the connecting plate (6) extends into a top portion of the inner cavity of the heat dissipating profile (2) of the bottom tube (21), and a second screw (92) passes through the top fixing hole (82) and then is connected and fixed to the connecting plate (6), so that the top light emitting tube (22) and the bottom tube (21) are combined to form a column body with the same appearance, and at the same time, the male conductive terminal (51) of the top light emitting tube (22) and the female conductive terminal (52) of the bottom tube (21) are plugged and coupled to realize electrical connection, thereby supplying power to each of the LED lamp beads (40), and the drive control circuit includes a power input socket interface (12) configured to connect an external low-voltage power adapter to input direct current low-voltage power and an MCU controller configured to control a light emitting state and a light emitting effect of the top light emitting tube (22), an output end of the MCU controller is electrically connected to the female conductive terminal (52) of the bottom tube (21), and is electrically connected through the male conductive terminal (51) of the top light emitting tube (22) connected to the female conductive terminal (52) of the bottom tube (21), the light source plate (4) is provided with at least one single-channel drive control IC (U1B) configured to drive and control the LED lamp beads (40) of the top light emitting tube (22) to emit light, each of the female conductive terminal (52) and the male conductive terminal (51) includes a four-wire power supply and control interface (J1, J4), and the four-wire power supply and control interface (J1, J4) includes a power supply positive electrode (VCC), a power supply negative electrode (GND), a white light control electrode (W−), and a signal electrode (DI).

3. The floor atmosphere lamp according to claim 1 or 2, wherein the connecting plate (6) is a profile, and a cross-sectional shape and a size of the connecting plate (6) are adapted to a cross-sectional shape and a size of the inner cavity of the heat dissipating profile (2).

4. The floor atmosphere lamp according to claim 1 or 2, wherein the drive control circuit is disposed in the base (1), and the power input socket interface (12) is disposed on the base (1).

5. The floor atmosphere lamp according to claim 1 or 2, wherein the base (1) is provided with a control button (61) configured to control the drive control circuit to control each of the light source plates (4) to emit light.

6. The floor atmosphere lamp according to claim 1 or 2, wherein the base (1) is provided with a remote control receiving sensor (11) that is controlled by a remote controller and is configured to receive a remote control sensing signal so as to control each of the light source plates (4) to emit light and to change different light emitting modes and colors through the drive control circuit.

7. The floor atmosphere lamp according to claim 1 or 2, wherein the drive control circuit includes an APP network control module that is controlled by a mobile phone APP and is configured to receive a network control signal and control each of the light source plates (4) to emit light and change different light emitting modes and colors through the drive control circuit.

8. The floor atmosphere lamp according to claim 1 or 2, wherein a top portion of the top light emitting tube (22) is provided with a top cover (7).

9. The floor atmosphere lamp according to claim 1 or 2, wherein the first screw (91) is a set screw, the second screw (92) is a flat head screw configured to limit a screwing depth by clamping a screw head outside the top fixing hole (82).

10. The floor atmosphere lamp according to claim 1 or 2, wherein each of the heat dissipating profiles (2) is provided with one top fixing hole (82) and two bottom fixing holes (81).

11. The floor atmosphere lamp according to claim 1 or 2, wherein a voltage of the power supply positive electrode (VCC) is +12 V or +24 V.

12. The floor atmosphere lamp according to claim 1 or 2, wherein each of the LED lamp beads (40) includes an RGB three-in-one lamp bead configured to separately emit red light, green light, blue light or combined light and a white light LED lamp bead configured to separately emit white light, and is controlled by the single-channel drive control IC (U1B) to change different light emitting modes and colors to realize colorful light emitting and a plurality of light emitting modes.

13. The floor atmosphere lamp according to claim 12, wherein the power supply positive electrode (VCC) is used for supplying power to each of the LED lamp beads (40) and the single-channel drive control IC (U1B), the white light control electrode (W−) is used for separately transmitting a white light control signal sent by the MCU controller and used for adjusting and controlling a switch and brightness of the white light LED lamp bead, and the signal electrode (DI) is used for transmitting a light emitting control signal sent by the MCU controller to the single-channel drive control IC (U1B) to adjust and control the RGB three-in-one lamp bead.

14. The floor atmosphere lamp according to claim 13, wherein the single-channel drive control IC (U1B) is a three-channel LED drive control IC configured to separately output three independent control signals of RGB.

* * * * *